United States Patent
Yang et al.

(10) Patent No.: US 9,891,862 B2
(45) Date of Patent: Feb. 13, 2018

(54) FORENSIC DATA ACQUISITION APPARATUS AND METHOD FOR GUARANTEEING INTEGRITY OF FLASH MEMORY IN SMART DEVICE

(71) Applicant: ELECTRONICS AND TELECOMMUNICATIONS RESEARCH INSTITUTE, Daejeon (KR)

(72) Inventors: Seungjei Yang, Daejeon (KR); Jungho Choi, Daejeon (KR); Kibom Kim, Daejeon (KR); Taejoo Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 195 days.

(21) Appl. No.: 14/930,729

(22) Filed: Nov. 3, 2015

(65) Prior Publication Data

US 2017/0024164 A1    Jan. 26, 2017

(30) Foreign Application Priority Data

Jul. 21, 2015    (KR) .................. 10-2015-0103239

(51) Int. Cl.
*G06F 11/00*    (2006.01)
*G06F 3/06*    (2006.01)
(Continued)

(52) U.S. Cl.
CPC .......... *G06F 3/0652* (2013.01); *G06F 3/0623* (2013.01); *G06F 3/0679* (2013.01);
(Continued)

(58) Field of Classification Search
CPC .... G06F 3/0623; G06F 3/0652; G06F 3/0679; G06F 9/4403; G06F 11/004; G06F 11/07;
(Continued)

(56) References Cited

U.S. PATENT DOCUMENTS 8,806,279 B2    8/2014    Lee et al.
9,164,845 B2    10/2015    Hwang et al.
(Continued)

FOREIGN PATENT DOCUMENTS

KR    10-2010-0136111 A    12/2010
KR    10-1046025 B1    7/2011
(Continued)

OTHER PUBLICATIONS

Timothy Vidas et al., "Toward a general collection methodology for Android devices," Digital Investigation, 2011.
(Continued)

*Primary Examiner* — Joshua P Lottich
(74) *Attorney, Agent, or Firm* — LRK Patent Law Firm

(57) ABSTRACT

Forensic data acquisition apparatus and method. The forensic data acquisition apparatus according to an embodiment includes a command analysis unit for activating a boot loader and a Universal Serial Bus (USB) module of a smart device and analyzing a format of a flash memory read command based on results of analysis of the boot loader, a partition information analysis unit for analyzing partition information of flash memory in compliance with the flash memory read command, and a data acquisition unit for generating a dump image by dumping data stored in the flash memory based on the flash memory read command and the partition information, and for acquiring forensic data based on the dump image.

20 Claims, 12 Drawing Sheets

(51) Int. Cl.
*G06F 9/44* (2006.01)
*G06F 11/07* (2006.01)

(52) U.S. Cl.
CPC .......... *G06F 9/4403* (2013.01); *G06F 11/004* (2013.01); *G06F 11/07* (2013.01); *G06F 11/0703* (2013.01); *G06F 11/0706* (2013.01); *G06F 11/0727* (2013.01); *G06F 11/0751* (2013.01); *G06F 11/0778* (2013.01); *G06F 11/0796* (2013.01)

(58) Field of Classification Search
CPC ............. G06F 11/0703; G06F 11/0706; G06F 11/0727; G06F 11/0751; G06F 11/0768; G06F 11/0796
See application file for complete search history.

(56) References Cited

U.S. PATENT DOCUMENTS

| | | | | |
|---|---|---|---|---|
| 2009/0164740 A1* | 6/2009 | Choi | ................ | G06F 11/0715 711/158 |
| 2011/0055626 A1* | 3/2011 | Yang | ................ | G06F 11/0727 714/6.12 |
| 2013/0061087 A1* | 3/2013 | Kopylovitz | ............ | G06F 11/106 714/6.3 |
| 2013/0247186 A1* | 9/2013 | LeMasters | ............ | G06F 21/572 726/22 |
| 2015/0317477 A1* | 11/2015 | Piper | ................ | G06F 11/0748 726/23 |
| 2016/0110240 A1* | 4/2016 | Reger | ................ | G06F 11/079 714/37 |
| 2016/0350166 A1* | 12/2016 | Andrews | ............... | G06F 11/079 |
| 2016/0350187 A1* | 12/2016 | Saliba | ................ | H03M 13/353 |

FOREIGN PATENT DOCUMENTS

| | | |
|---|---|---|
| KR | 10-1078289 B1 | 10/2011 |
| KR | 10-2014-0142782 A | 12/2014 |

OTHER PUBLICATIONS

Namheun Son et al., "A study of user data integrity during acquisition of Android devices," Digital Investigation, 2013.

\* cited by examiner

| MODEL | FIRMWARE UPDATE MODE | MODE ENTRY METHOD |
|---|---|---|
| SAMSUNG GALAXY | ODIN | 1: VOLUME-DOWN KEY + HOME KEY + POWER KEY AND VOLUME- DOWN KEY<br>2: 300KΩ USB JIG CONNECTION |
| LG OPTIMUS | DOWNLOAD | 1: VOLUME-UP KEY + USB CABLE CONNECTION<br>2: 910KΩ USB JIG CONNECTION |
| PANTECH VEGA | PDL DOWNLOAD | VOLUME-UP KEY + VOLUME-DOWN KEY + HOME KEY + POWER KEY |
| XIAOMI | FASTBOOT | VOLUME-DOWN KEY + POWER KEY |
| HUAWEI | FASTBOOT | VOLUME-DOWN KEY + POWER KEY |
| GOOGLE NEXUS 4/5 | DOWNLOAD | 1: VOLUME-UP KEY + USB CABLE CONNECTION<br>2: 910KΩ USB JIG CONNECTION |
| HTC | HBOOT | VOLUME-DOWN KEY + POWER KEY |

FIG. 4

SAMSUNG 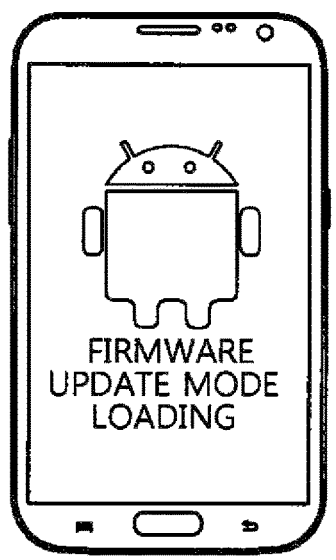
LG 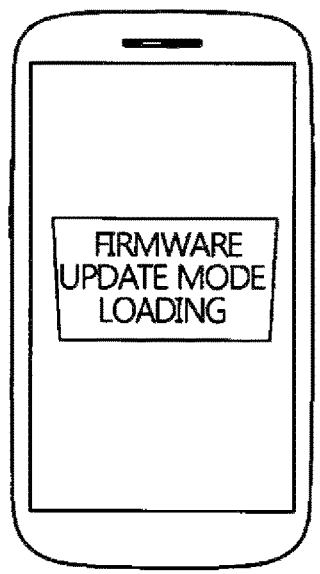
PANTECH 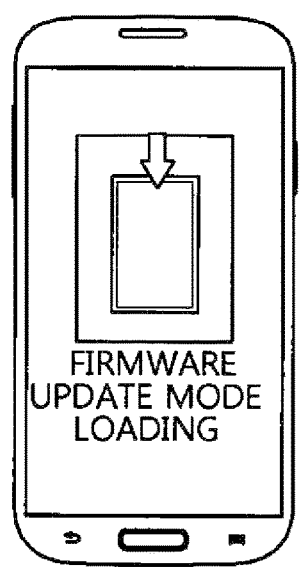
FIG. 5

| | | | |
|---|---|---|---|
| Partition | modem | : 0x00004000 | ~ 0x00023FFF |
| Partition | sbl1 | : 0x00024000 | ~ 0x000243FF |
| Partition | sbl2 | : 0x00024400 | ~ 0x000247FF |
| Partition | sbl3 | : 0x00024800 | ~ 0x000257FF |
| Partition | aboot | : 0x00025800 | ~ 0x00025BFF |
| Partition | rpm | : 0x00025C00 | ~ 0x00025FFF |
| Partition | boot | : 0x00028000 | ~ 0x00033FFF |
| Partition | tz | : 0x00034000 | ~ 0x000343FF |
| Partition | pad | : 0x00034400 | ~ 0x00034401 |
| Partition | modemst1 | : 0x00034402 | ~ 0x00035C01 |
| Partition | modemst2 | : 0x00035C02 | ~ 0x00037401 |
| Partition | m9kefs1 | : 0x00038000 | ~ 0x00038617 |
| Partition | m9kefs2 | : 0x00038618 | ~ 0x00038C2F |
| Partition | m9kefs3 | : 0x00038C30 | ~ 0x00039247 |
| Partition | drm | : 0x0003C000 | ~ 0x0003FFFF |
| Partition | sns | : 0x00040000 | ~ 0x00043FFF |
| Partition | ssd | : 0x00044000 | ~ 0x0004400F |
| Partition | misc | : 0x00044010 | ~ 0x0004C00F |
| Partition | factory | : 0x0004C010 | ~ 0x0005400F |
| Partition | bnr | : 0x00054010 | ~ 0x0005800F |
| Partition | encrypt | : 0x00058010 | ~ 0x0005840F |
| Partition | eksst | : 0x00058410 | ~ 0x0005880F |
| Partition | system | : 0x0005C000 | ~ 0x0045BFFF |
| Partition | cache | : 0x0045C000 | ~ 0x005E8FFF |
| Partition | userdata | : 0x005EC000 | ~ 0x03BDFFFF |
| Partition | persist | : 0x038E0000 | ~ 0x03BE3FFF |
| Partition | tombstones | : 0x038E4000 | ~ 0x03963FFF |
| Partition | recovery | : 0x03964000 | ~ 0x0396FFFF |
| Partition | fsg | : 0x03970000 | ~ 0x039717FF |
| Partition | DDR | : 0x03971800 | ~ 0x0397180F |
| Partition | fota | : 0x03974000 | ~ 0x03983FFF |
| Partition | mpt | : 0x03974000 | ~ 0x03993FFF |
| Partition | tzbak | : 0x03994000 | ~ 0x039943FF |
| Partition | rpmbak | : 0x03994400 | ~ 0x039947FF |
| Partition | ve | : 0x03994800 | ~ 0x0399C7FF |
| Partition | reserved | : 0x0399C800 | ~ 0x039A47FF |
| Partition | grow | : 0x039A4800 | ~ 0x03A3DFDE |

FIG. 7

READ COMMAND

| 0x50 | SUB COMMAND | START ADDRESS(4) | DUMP SIZE(4) | CRC |
|------|-------------|------------------|--------------|-----|

ACQUISITION CAPTURE

Send 0x1c bytes to the device

```
7E 50 01 01 00 00 00 00 00 00 80 02 00 00 02 00     -P......C.....
00 00 00 00 00 00 00 00 00 7C 1B 7E                 .........|.~         PC→PHONE
```

011124:Bulk or Interrupt Transfer (UP), 26.01.2015 15:07:07.077 .0.
Pipe Handle:0x134324b8(Endpoint Address:0x83)
Get.0x3f454 bytes from the device

```
50 01 01 00 00 00 00 00 00 80 02 00 00 02 00 00     P.......C.....
04 E7 03 00 00 00 00 00 E0 1C 41 4E 44 52 4F 49     .?....?ANDROI
44 21 A0 00 74 00 00 80 20 80 63 9C 29 00 00 00     D!..t... .c.)...
20 82 00 00 00 00 00 80 10 81 00 01 20 80 00 08      .......?..  C.....
00 00 00 00 00 00 38 06 FA E0 89 76 6D 61 6C 6C     ......8....vmall
6F 63 3D 36 30 30 4D 20 63 6F 6E 73 6F 6C 65 3D     OM console'ttyH5
74 74 79 48 53 4C 30 2C 31 31 35 32 30 30 2C 6E     LO,115200,n8 1pj
38 20 6C 70 6A 3D 36 37 36 37 37 20 75 73 65 72     -67677 user_debu
5F 64 65 62 75 67 3D 33 31 20 6D 73 6D 5F 72 74     g'31 mrm_rtb.fil
62 2E 66 69 6C 74 65 72 3D 30 78 30 20 65 68 63     ter'0x0 ehci-hcd
69 2D 68 63 64 2E 70 61 72 6B 3D 33 20 63 6F 72     .park'3 coresigh     PC→PHONE
65 73 69 67 68 74 2D 65 74 6D 2E 62 6F 6F 74 5F     t-etm.boot_enabl
65 6E 61 62 6C 65 3D 30 20 61 6E 64 72 6F 69 64     e'0 androdidboot.
65 6F 6F 74 2E 68 61 72 64 77 61 72 65 3D 67 65     hardware'geehrc8
65 68 72 63 38 AF FC 38 13 F0 FF F0 28 E0 04 5A
36 5C F0 DC 20 32 3A 7D 5D 07 D5 74 26 47 FE D5
DD D3 D4 BC 39 68 F0 FF F0 2B 39 51 F0 FF F0 FF
F0 FF F0 FF F0 04 98 A0 E1 04 F0 06 EA 02 00 00
EA 18 28 6F 01 00 00 00 26 E0 18 00 74 00 01 70
A0 E1 02 80 A0 E0 00 20 0F E1 03 00 12 E3 01 00
00 1A 17 00 A0 E3 56 34 12 EF 00 20 0F E1 C0 20
02 E3 02 F0 21 E1 2C B2 E0 EC A4 47 9F E5 55 00
00 EB 4A 0F 8F E2 4E 1C 90 E8 1C D0 90 E5 01 00
```

FIG. 8

| READ COMMAND(32BYTES) |||||| 
|---|---|---|---|---|---|
| 0x06(4) | PARTITION ID(4) | 0x00(4) | START ADDRESS(4) | DUMP SIZE(4) | 0x00(12) |

| READ COMMAND(128BYTES) |||||||
|---|---|---|---|---|---|---|
| 0x06(4) | PARTITION ID(4) | PARTITION NAME(12) | 0x00(8) | START ADDRESS(8) | DUMP SIZE(8) | 0x00(84) |

ACQUISITION CAPTURE

Send 0xt0 bytes to the device

```
00 00 00 00 07 00 00 00 42 42 42 54 00 00 00 00    .......boot..
00 00 00 00 00 00 00 00 00 00 00 00 00 00 00 00    ................
00 00 00 00 00 00 01 00 00 00 00 00 00 00 00 00    ................
00 00 00 00 00 00 00 00 00 00 00 00 00 00 00 00    ................         PC→PHONE
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
```

011124:Bulk or Interrupt Transfer (UP), 26.01.2015 16:18:01.515 .0.0(3.
Pipe Handle:0x134324b8(Endpoint Address:0x81)
Get.0x1000 bytes from the device

```
06 00 00 00 07 00 00 00 42 45 45 54 00 00 00 00    .......boot..
00 00 00 00 00 00 00 00 00 00 00 00 00 00 00 00    ................
00 00 00 00 00 10 01 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
41 45 44 52 45 45 44 21 60 65 61 00 00 60 00 00    ANDROID:'na..k..
DA CC 0L 00 00 00 00 01 00 00 00 00 00 00 70 00           n          PC→PHONE
00 01 00 00 00 00 00 00 68 03 00 00 00 00 00 00    ................
00 00 00 00 00 00 00 00 00 00 00 00 00 00 00 00    ............c
63 33 33 30 65 38 20 61 65 64 72 6F 69 64 62 6F    onscle0x000.1132
02 33 33 3C 6E 38 30 61 6E 64 72 6F 69 64 62 6F    00.ns androidboo
cr 74 2E 6B 61 72 64 77 61 72 65 3D 71 63 6r 6D    t.hardware'qcom
20 75 73 65 72 5F 64 65 62 75 67 3D 33 31 20 6D    user_debug'31 us
73 40 3r 72 74 42 24 66 69 62 74 65 72 3D 3D 74    i_lsd.filer-txt
33 37 20 65 65 63 65 2D 68 63 64 2E 70 61 72 6B    7 ehoi-hod.park-
3D 33 30 T6 6D 62 6C 6C 6r 63 3D 32 36 30 4D 20    3 vmaiicc-2tox 1
6C 6F 6T 6C 65 T6 65 6C 3D 30 00 00 00 00 00 00    00level-0......
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
00 00 00 00 00 00 00 00 00 00 00 00 00 00 00 00    ................
```

FIG. 9

FORENSIC DATA ACQUISITION APPARATUS AND METHOD FOR GUARANTEEING INTEGRITY OF FLASH MEMORY IN SMART DEVICE

CROSS REFERENCE TO RELATED APPLICATION

This application claims the benefit of Korean Patent Application No. 10-2015-0103239, filed Jul. 21, 2015, which is hereby incorporated by reference in its entirety into this application.

BACKGROUND OF THE INVENTION

1. Technical Field

The present invention generally relates to technology for acquiring forensic data stored in flash memory in a smart device and, more particularly, to technology for acquiring forensic data in the state in which only a boot loader and a Universal Serial Bus (USB) module are activated in order to guarantee the integrity of data.

2. Description of the Related Art

Recently, with the advent of various smart devices such as smart phones, smart TVs, and wearable devices, various technologies that are used for business purposes as well as personal purposes have appeared. As a result, the incidence of mobile crime, involving for example various malicious code and smishing, which are intended for smart devices, has rapidly increased, and thus the importance of mobile forensics has gradually increased. Therefore, research into methods for acquiring the entire contents of flash memory in order to restore deleted files and analyze details is required.

Conventional methods for acquiring data from smart devices have acquired data using a rooting method based on the vulnerability of a kernel. However, such methods do not support data acquisition for the latest Operating System (OS) until a new vulnerability is discovered because vulnerability to rooting is patched with the upgrade of an OS version. Further, with the application of security technology such as secure boot and Samsung's Knox, it has become more and more difficult to acquire data. Such a method is configured such that, after rooting, a data acquisition procedure is performed. During the rooting procedure, a system and data falsification procedure occurs, and thus a problem arises in that the integrity of the acquired flash memory data is not maintained.

As another data acquisition method, there is a method for acquiring data by replacing a custom recovery image. This method is a method of accessing a user data area by replacing only a recovery area, and relates to research into the guarantee of the integrity of the user data area. However, this method is problematic in that, since a custom recovery image is flashed, it is impossible to guarantee the integrity of dump images of the entire contents of flash memory.

Hardware-based acquisition methods may include a method utilizing a Joint Test Action Group (JTAG) port on a Printed Circuit Board (PCB). However, recently, for reasons of security, manufactures have a tendency to remove or deactivate a JTAG port on a PCB. As another hardware-based method for acquiring data, there is a method of removing flash memory from a given device (chip-off) and then acquiring data, but it is limited in that data may be acquired only when a power failure occurs or a fault occurs due to a problem such as damage to the smart device that contains evidence.

Korean Patent No. 1046025 discloses technology for extracting data from an embedded system. In particular, there is disclosed technology for extracting data from flash memory in the form of binary code using a JTAG interface on a PCB in an embedded system. However, Korean Patent No. 1046025 cannot acquire data in the state in which a JTAG port is connected to a JTAG emulator. In other words, when the JTAG port is deactivated, the disclosed technology cannot be used. In light of the recent tendency to deactivate the JTAG port on PCBs in smart devices in order to realize information protection, Korean Patent No. 1046025 has a fatal disadvantage in that the JTAG port must be essentially used.

Therefore, in response to the increased popularity of smart devices and the necessity to collect evidentiary data for evidence in solving crimes, technology that acquires forensic data without damaging a smart device containing evidentiary data is required.

SUMMARY OF THE INVENTION

Accordingly, the present invention has been made keeping in mind the above problems occurring in the prior art, and an object of the present invention is to acquire forensic data without damaging a smart device that contains evidence.

Another object of the present invention is to acquire forensic data while guaranteeing the integrity of flash memory in a smart device that contains evidence.

In accordance with an aspect of the present invention to accomplish the above objects, there is provided a forensic data acquisition apparatus, including a command analysis unit for activating a boot loader and a Universal Serial Bus (USB) module of a smart device and analyzing a format of a flash memory read command using the boot loader, a partition information analysis unit for analyzing partition information of flash memory in compliance with the flash memory read command; and a data acquisition unit for generating a dump image by dumping data stored in the flash memory based on the flash memory read command and the partition information, and for acquiring forensic data based on the dump image.

The command analysis unit may cause the smart device to enter a firmware update mode and then enable only the boot loader and the USB module to be activated.

The command analysis unit may analyze the smart device, determine resistance between pins 4 and 5 of a USB cable for connecting the smart device that is intended to enter the firmware update mode to the forensic data acquisition apparatus, and control the USB cable based on the resistance, thus causing the smart device to enter the firmware update mode.

The command analysis unit may analyze the flash memory read command based on results of analysis of a firmware update protocol for firmware in a Secondary Boot Loader (SBL) and in an Android boot loader (Aboot) provided in the boot loader.

The flash memory read command may include a read command signature field, a flash memory start address field, a dump size field, and a read command end field.

The command analysis unit may be configured to, when the smart device is powered on, terminate the smart device and enter the firmware update mode.

The partition information analysis unit may include a partition type analysis unit for analyzing types of partitions based on a partition signature of the flash memory; and an information analysis unit for parsing partition table values corresponding to the partitions and analyzing one or more of a size of the flash memory, names of the partitions, start addresses of the partitions, and end addresses of the partitions.

The data acquisition unit may include a mode selection unit for selecting any one of a whole flash memory dump mode and a partition dump mode for the partitions in the flash memory; a whole dump performance unit for, when the whole flash memory dump mode is selected, performing a dump at a selected dump image selection location in units of sectors; and a partition dump performance unit for, when the partition dump mode is selected, performing a dump at a dump image generation location corresponding to each selected partition in units of sectors of the partition.

The forensic data acquisition apparatus may further include an integrity verification unit for generating a hash value using the data and a hash function and verifying integrity of the data using the hash value.

The forensic data acquisition apparatus may further include an output unit for outputting a procedure for generating the hash value and the dump image.

In accordance with another aspect of the present invention to accomplish the above objects, there is provided a forensic data acquisition method, including activating a boot loader and a Universal Serial Bus (USB) module of a smart device and analyzing a format of a flash memory read command based on results of analysis of the boot loader, analyzing partition information of flash memory in compliance with the flash memory read command; and generating a dump image by dumping data stored in the flash memory based on the flash memory read command and the partition information, and acquiring forensic data based on the dump image.

Analyzing the format of the flash memory read command format may be configured to cause the smart device to enter a firmware update mode and then enable only the boot loader and the USB module to be activated.

Analyzing the format of the flash memory read command may be configured to analyze the smart device, determine resistance between pins 4 and 5 of a USB cable for connecting the smart device that is intended to enter the firmware update mode to the forensic data acquisition apparatus, and control the USB cable based on the resistance, thus causing the smart device to enter the firmware update mode.

Analyzing the format of the flash memory read command may be configured to analyze the flash memory read command based on results of analysis of a firmware update protocol for firmware in a Secondary Boot Loader (SBL) and an Android boot loader (Aboot) provided in the boot loader.

The flash memory read command may include a read command signature field, a flash memory start address field, a dump size field, and a read command end field.

Analyzing the format of the flash memory read command may be configured to, when the smart device is powered on, terminate the smart device and enter the firmware update mode.

Analyzing the partition information may include analyzing types of partitions based on a partition signature of the flash memory; and parsing partition table values corresponding to the partitions and analyzing one or more of a size of the flash memory, names of the partitions, start addresses of the partitions, and end addresses of the partitions.

Acquiring the forensic data may include selecting any one of a whole flash memory dump mode and a partition dump mode for the partitions in the flash memory; when the whole flash memory dump mode is selected, performing a dump at a selected dump image selection location in units of sectors; and when the partition dump mode is selected, performing a dump at a dump image generation location corresponding to each selected partition in units of sectors of the partition.

The forensic data acquisition method may further include generating a hash value using the data and a hash function and verifying integrity of the data using the hash value.

The forensic data acquisition method may further include outputting a procedure for generating the hash value and the dump image.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing the state in which a smart device enters a firmware update mode in the forensic data acquisition apparatus according to an embodiment of the present invention;

FIG. 5 is a diagram showing a screen output after the smart device enters a firmware update mode in the forensic data acquisition apparatus according to an embodiment of the present invention;

FIG. 7 is a diagram showing a screen on which the forensic data acquisition apparatus acquires and outputs partition information according to an embodiment of the present invention;

FIGS. 8 and 9 are diagrams showing a command format for reading flash memory in the forensic data acquisition apparatus according to an embodiment of the present invention;

DESCRIPTION OF THE PREFERRED EMBODIMENTS

Figure 1:
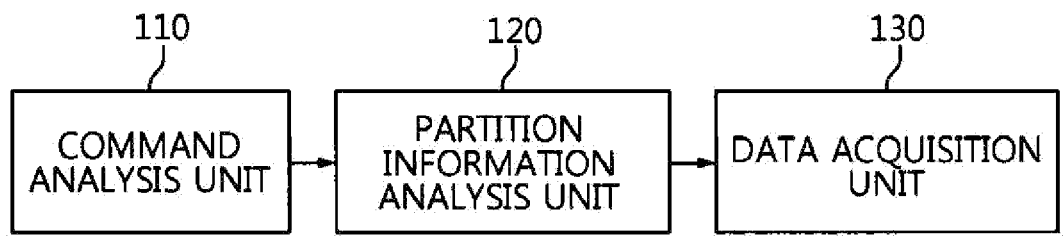
FIG. 1 is a block diagram showing a forensic data acquisition apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a forensic data acquisition apparatus according to an embodiment of the present invention.

Referring to FIG. 1, the forensic data acquisition apparatus according to the embodiment of the present invention includes a command analysis unit 110, a partition information analysis unit 120, and a data acquisition unit 130.

The command analysis unit 110 enters a firmware update mode for firmware in the boot loader of a smart device to activate a boot loader and a USB module, and analyze the format of the flash memory read command corresponding to the firmware update mode.

Since the firmware update mode corresponds to the state in which only the boot loader and the USB module are activated, the integrity of data may be guaranteed even if a physical dump is performed multiple times. Existing data acquisition technologies use kernel vulnerability-based rooting, a method of replacing custom recovery, or a method of acquiring hardware data via JTAG and chip-off techniques. However, such conventional technology is problematic in that the system and user data areas in flash memory may be falsified, the recovery area may be compromised, or the integrity of evidentiary data may be damaged due to the disassembly and reassembly of hardware. However, in the firmware update mode, since only the boot loader and the USB module are activated, the integrity of data may be guaranteed.

The smart device denotes an embedded system-equipped device, such as a smart phone, a smart TV, a wearable smart watch, or an Internet of Things (IoT) smart device.

Here, methods of entering the firmware update mode for respective system manufacturers differ from each other. However, such a firmware update mode is necessarily present in all smart devices in order to release new OS versions and patch software.

Each smart device may enter the firmware update mode via the manipulation of a button key in the state in which the system is powered off.

To enter the firmware update mode, the command analysis unit 110 may enter the firmware update mode using resistance between pins 4 and 5 of a USB cable for connecting the smart device to the forensic data acquisition apparatus.

In the case of the USB cable, the access mode may differ depending on the resistance between pins 4 and 5. That is, the smart device may enter the firmware update mode depending on the resistance between pins 4 and 5. For example, when the resistance between pins 4 and 5 is 300 KΩ, a specific smart phone may enter the firmware update mode. When the resistance between pins 4 and 5 is 910 KΩ, another smart phone may enter the firmware update mode. That is, the command analysis unit 110 may determine the resistance between pins 4 and 5 of the USB cable for connecting the smart device that desires to enter the firmware update mode to the forensic data acquisition apparatus, and may control the USB cable based on the determined resistance, thus entering the firmware update mode.

The scheme for entering the firmware update mode may differ for each smart device. Referring to FIG. 4, the scheme for entering the firmware update mode may differ for each model. For example, to enter the firmware update mode in High-Tech Computer (HTC)'s model, shown in FIG. 4, a method of simultaneously pressing a volume-down key and a power key may be used. However, to enter the firmware update mode in Samsung's Galaxy, a method of simultaneously pressing a volume-down key, a home key, and a power key or of utilizing a USB cable having 300 KΩ may be used.

Once the firmware update mode has been entered, the screen output of the smart device is as illustrated in FIG. 5. Referring to FIG. 5, it can be seen that the screen output of the smart device at ordinary times is different from the screen output of the smart device in the firmware update mode.

Here, the command analysis unit 110 may analyze a flash memory read command. In the case of the flash memory read command, the command analysis unit 110 may analyze a firmware update protocol, and then analyze a flash memory access command format and a flash memory read command format.

Here, the firmware update protocol may be independently implemented by each existing manufacturer, and does not follow an open standard format. Therefore, a new model that does not use the existing firmware update protocol requires a task of analyzing the firmware update protocol, in which both a flash memory access command format and a flash memory read command format are stored. The firmware update protocol is implemented in a Secondary Boot Loader (SBL) or an Android boot loader (Aboot) provided in a boot loader, and thus the SBL or Aboot is analyzed, thus enabling the new flash memory access command and the new flash memory read command to be analyzed. A detailed description thereof will be made later with reference to FIG. 6.

In this case, the command analysis unit 110 sends a model information identification command to the system corresponding to the smart device, and determines whether the system is a model in which a dump function is supported. If the system is a new model in which a dump function is not supported, the command analysis unit 110 may analyze a firmware update protocol in the boot loader and then analyze a flash memory access command format and a flash memory read command format.

The partition information analysis unit 120 analyzes the partition information of the flash memory in compliance with the flash memory read command.

Recent smart devices mainly use a package structure in which NAND flash memory, called an Embedded Multi Media Card (Emmc), and a controller are integrated, and efficiently manage stored data using a file system, such as Yet Another Flash File System (YAFFS) or External File system (EXT) 3/4. Further, partitions such as BOOT, RECOVERY, SYSTEM, and USERDATA are mounted and used in smart devices using a partition function. To acquire data from such flash memory, information about the partitions of the flash memory is required.

Each smart device may access the partition signature of the flash memory using a flash memory read command, and may analyze the types of partitions using the partition signature.

Here, the types of partitions may include a Master Boot Record (MBR), a GUID Partition Table (GPT), etc.

The partition table values corresponding to the partitions are parsed, so that the size of the flash memory, the names of the partitions, the address at which each partition starts, and the address at which each partition ends may be analyzed.

The results of analysis may be output via an output unit, and are illustrated in FIG. 7. Referring to FIG. 7, the total number of partitions, the names of the partitions, and the start addresses and end addresses of the partitions are illustrated.

The data acquisition unit 130 dumps the data stored in the flash memory based on the flash memory read command and the partition information, generates a dump image, and acquires forensic data based on the dump image.

Here, the data acquisition unit 130 may select any one of a whole flash memory dump mode, in which the entire contents of flash memory are dumped, and a partition dump mode, in which the contents of partitions in the flash memory are dumped. When the whole flash memory dump mode is selected, a dump may be performed at the selected dump image generation location in units of sectors of the flash memory. Meanwhile, when the partition dump mode is selected, a dump is performed at the dump image generation location corresponding to each partition in units of sectors in the partition, and then a dump image may be generated. In the present invention, in the firmware update mode in which only the boot loader and the USB module are activated, an image may be physically dumped. As a result, even if data is repeatedly acquired multiple times, the integrity of the data may be maintained without falsifying original evidentiary data.

Here, when the whole flash memory dump mode is selected, the data acquisition unit 130 may calculate the size and dump time of the whole flash memory and select the location at which a dump image is to be generated. The dumping size implemented by one flash memory read command may be set to the form of a multiple of 512 bytes, which is the sector size of the flash memory. When the dump is completed up to the last sector, a hash value for the acquired dump image may be generated.

Here, when the partition dump mode is selected, the data acquisition unit 130 may calculate the size and dump time of each partition and select the location at which a partition dump image is to be generated. A data acquisition procedure is performed for each selected partition. When the dump is completed up to the last sector of each partition, hash values for the acquired partition dump images may be generated.

Here, although not shown in FIG. 1, the forensic data acquisition apparatus may further include an integrity verification unit (not shown) for generating a hash value using data and a hash function and verifying the integrity of the data using the hash value, in order to verify the integrity of the acquired data. Since a hash function is generally used to verify the integrity of data, the present invention may use a hash function to verify the integrity of the acquired data (forensic data).

The forensic data acquisition apparatus according to the embodiment of the present invention may further include an output unit (or display unit) (not shown) for visualizing and outputting the hash value, generated by the integrity verification unit (not shown), and the data acquisition procedure.

Figure 2:
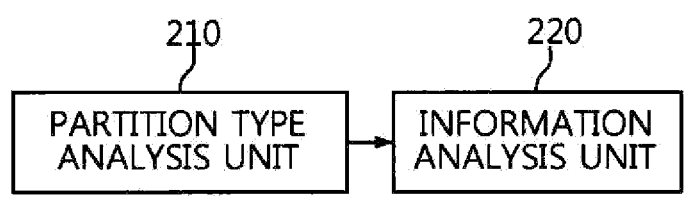
FIG. 2 is a block diagram showing the partition information analysis unit shown in FIG. 1.

FIG. 2 is a block diagram showing the partition information analysis unit shown in FIG. 1.

Referring to FIG. 2, the partition information analysis unit 120 includes a partition type analysis unit 210 and an information analysis unit 220.

In recent smart devices, a package structure in which NAND flash memory, called an Embedded Multi Media Card (Emmc), and a controller are integrated is mainly used. The stored data is efficiently managed using a file system such as Yet Another Flash File System (YAFFS) or EXT 3/4. Further, partitions, such as BOOT, RECOVERY, SYSTEM, and USERDATA, are mounted and used using a partition function. To acquire data from such flash memory, information about the partitions of the flash memory is required.

The partition type analysis unit 210 analyzes the types of partitions based on the partition signature of the flash memory.

The partition signature is data indicating the types of partitions. The types of partitions may include an MBR, a GPT, etc. To access the partition signature, the partition signature may be accessed using the flash memory read command analyzed by the command analysis unit 110.

The information analysis unit 220 parses partition table values corresponding to partitions, and analyzes the size of flash memory, the names of partitions, and the start addresses and end addresses of the partitions.

The results of analysis are transmitted to the data acquisition unit 130, and the data acquisition unit 130 dumps data stored in the flash memory using the partition information.

In this case, the results of analysis may be output via the output unit, and are illustrated in FIG. 7. Referring to FIG. 7, the total number of partitions, the names of partitions, and the start and end addresses of the partitions are illustrated.

Figure 3:
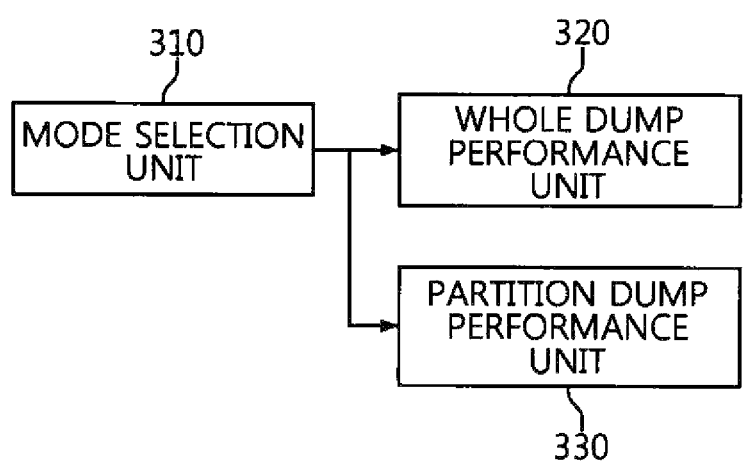
FIG. 3 is a block diagram showing the data acquisition unit shown in FIG. 1.

FIG. 3 is a block diagram showing the data acquisition unit shown in FIG. 1.

A mode selection unit 310 selects any one of a whole flash memory dump mode and a partition dump mode for partitions in the flash memory.

The whole flash memory dump mode denotes a mode in which all of the data stored in the flash memory is dumped.

The partition dump mode denotes a mode in which the data in partitions in the flash memory is dumped.

A whole dump performance unit 320 is configured to, when the whole flash memory dump mode is selected, perform a dump at a selected dump image generation location in units of sectors of the flash memory.

Here, the whole dump performance unit 320 is configured to, when the whole flash memory dump mode is selected, calculate the size and dump time of the whole flash memory, and select the location at which a dump image is to be generated. The dumping size implemented by one flash memory read command may be set to the form of a multiple of 512 bytes, which is the sector size of the flash memory. When the dump is completed up to the last sector, a hash value for the acquired dump image may be generated.

The partition dump performance unit 330 is configured to, when the partition dump mode is selected, perform a dump at the dump image generation location corresponding to each partition in units of sectors of the partition.

Here, the partition dump performance unit 330 is configured to, when the partition dump mode is selected, calculate the size and dump time of each partition and select the location where the partition dump image is to be generated. During the data acquisition procedure for each selected partition, when the dump has been completed up to the last sector of the selected partition, hash values for the acquired partition dump images may be generated.

Figure 6:
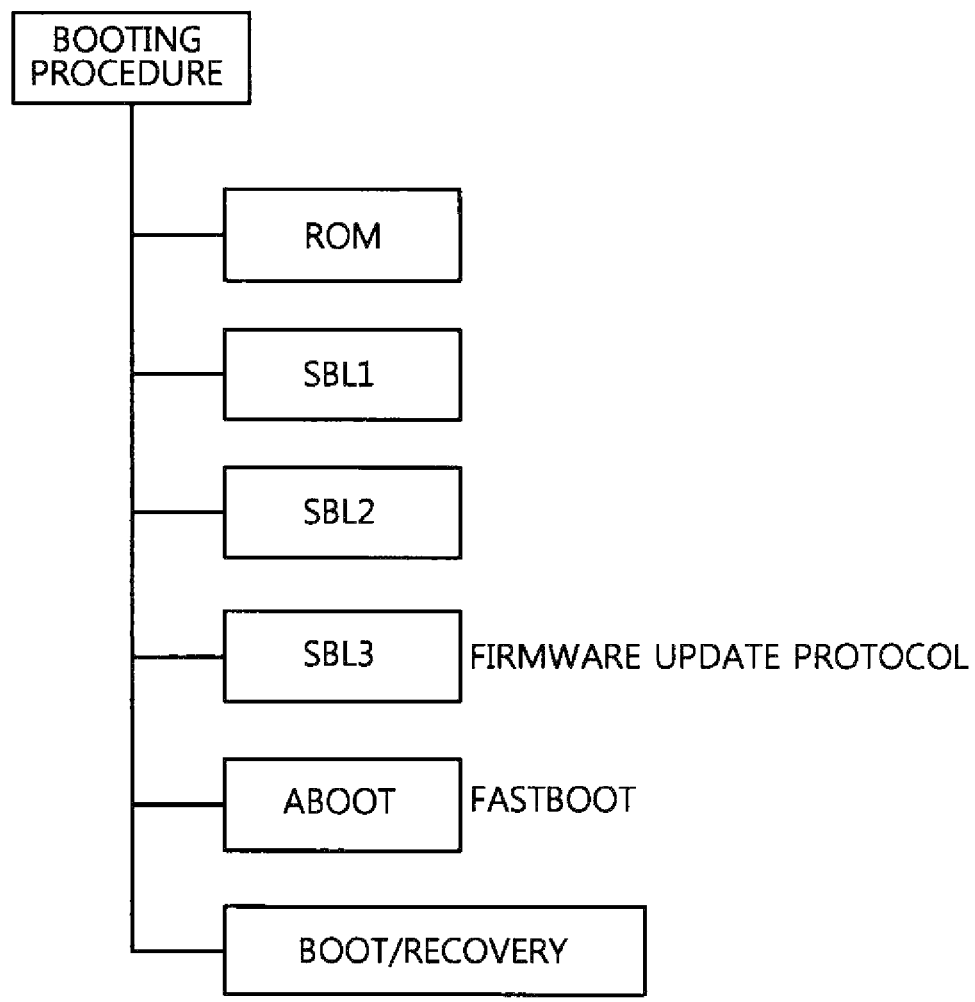
FIG. 6 is a diagram showing the procedure in which the smart device is booted in the forensic data acquisition apparatus according to an embodiment of the present invention.

FIG. 6 is a diagram showing the procedure in which a smart device is booted in the forensic data acquisition apparatus according to an embodiment of the present invention.

The procedure in which the smart device is booted is performed such that, when the system is powered on, the Read Only Memory (ROM) of the smart device is executed from address 0, and required initialization such as Central Processing Unit (CPU) configuration is performed. Thereafter, while a boot loader is loaded into the memory, tasks of initializing and configuring hardware, such as NAND or USB memory, are performed. This boot loader execution procedure is subjected to several stages, such as an Initial Boot Loader (IBL), Primary Boot Loader (PBL), and Secondary Boot Loader (SBL). A typical firmware update protocol is implemented in the SBL or Aboot. Therefore, when the SBL or Aboot is analyzed, a flash memory access command and a flash memory read command may be analyzed.

Referring to FIG. 6, after ROM has been operated, booting is performed in the sequence of SBL1, SBL2, SBL3, Aboot, and BOOT/RECOVERY. In FIG. 6, since the firmware update protocol is implemented in SBL3, both a flash memory access command and a flash memory read command may be analyzed if the SBL3 boot loader is analyzed.

FIGS. 8 and 9 are diagrams showing the command format used to read flash memory in the forensic data acquisition apparatus according to an embodiment of the present invention.

First, the flash memory read command uses each manufacturer's own packet format in the firmware update protocol of the manufacturer. Therefore, in the case of a new model that does not use an existing firmware update protocol, the procedure for reversely analyzing the boot loader, analyzing the firmware update protocol, and then identifying the flash memory read command is required.

The whole flash memory read command is illustrated in FIG. 8. The format of the whole flash memory read command may be configured in such a way that a read command signature field, a flash memory start address field, a dump size field, and a read command end field are sequentially arranged. In the lower portion of FIG. 8, the screen on which acquired data is visually output is illustrated.

In FIG. 9, the partition read command is illustrated. The format of the partition read command may be configured in such a way that a read command signature field, a partition name or ID field, a partition start address field, a dump size field, and a read command end field are sequentially arranged. In the lower portion of FIG. 9, the screen on which the acquired data is visually output is illustrated.

Figure 10:
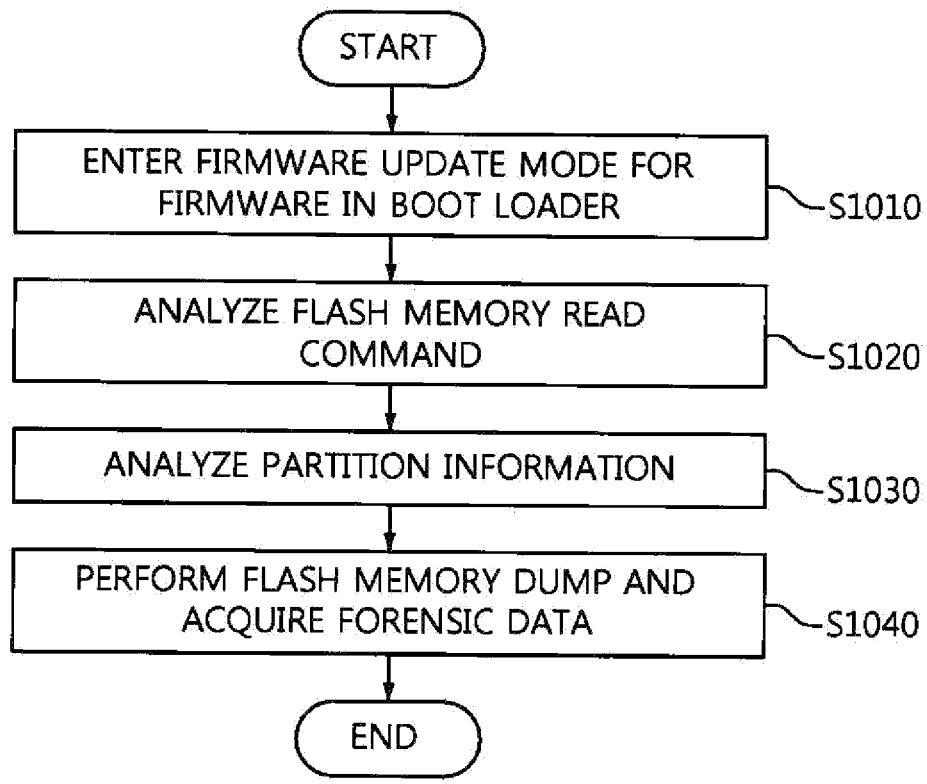
FIG. 10 is an operation flowchart showing a forensic data acquisition method according to an embodiment of the present invention.

FIG. 10 is an operation flowchart showing a forensic data acquisition method according to an embodiment of the present invention.

Referring to FIG. 10, the smart device enters a firmware update mode for firmware in the boot loader thereof at step S1010.

Here, when the smart device enters the firmware update mode, only the boot loader and the USB module of the smart device are activated, and remaining programs may be deactivated.

Since the firmware update mode corresponds to the state in which only the boot loader and the USB module are activated, the integrity of data may be guaranteed even if a physical dump is performed multiple times. Conventional data acquisition technologies use kernel vulnerability-based rooting, a method of replacing custom recovery, and a method of acquiring hardware data via JTAG and chip-off techniques. However, such conventional technology is problematic in that the system and user data areas in the flash memory may be falsified, the recovery area may be compromised, or the integrity of evidentiary data may be damaged due to the disassembly and reassembly of hardware. However, since, in the firmware update mode, only the boot loader and the USB module are activated and the remaining programs are deactivated, the integrity of data may be guaranteed.

The smart device denotes an embedded system-equipped device, such as a smart phone, a smart TV, a wearable smart watch, or an Internet of Things (IoT) smart device.

Here, methods of entering the firmware update mode for respective system manufacturers differ from each other. However, such a firmware update mode is necessarily present in all smart devices in order to release new OS versions and patch software.

Each smart device may enter the firmware update mode via the manipulation of a button key in the state in which the system is powered off.

To enter the firmware update mode, the command analysis unit 110 may enter the firmware update mode using resistance between pins 4 and 5 of a USB cable for connecting the smart device to the forensic data acquisition apparatus.

In the case of the USB cable, the access mode may differ depending on the resistance between pins 4 and 5. That is, the smart device may enter the firmware update mode depending on the resistance between pins 4 and 5. For example, when the resistance between pins 4 and 5 is 300 KΩ, a specific smart phone may enter the firmware update mode. When the resistance between pins 4 and 5 is 910 KΩ, another smart phone may enter the firmware update mode. That is, the command analysis unit 110 may determine the resistance between pins 4 and 5 of the USB cable for connecting the smart device that desires to enter the firmware update mode to the forensic data acquisition apparatus, and may control the USB cable based on the determined resistance, thus entering the firmware update mode.

The scheme for entering the firmware update mode may differ for each smart device. Referring to FIG. 4, the scheme for entering the firmware update mode may differ for each model. For example, to enter the firmware update mode in High-Tech Computer (HTC)'s model, shown in FIG. 4, a method of simultaneously pressing a volume-down key and a power key may be used. However, to enter the firmware update mode in Samsung's Galaxy, a method of simultaneously pressing a volume-down key, a home key, and a power key or of utilizing a USB cable having 300 KΩ may be used.

Once the firmware update mode has been entered, the screen output of the smart device is as illustrated in FIG. 5. Referring to FIG. 5, it can be seen that the screen output of the smart device at ordinary times is different from the screen output of the smart device in the firmware update mode.

Further, a read command for flash memory is analyzed at step S1020.

Here, the command analysis unit 110 may analyze a flash memory read command. In the case of the flash memory read command, the command analysis unit 110 may analyze a firmware update protocol, and then analyze a flash memory access command format and a flash memory read command format.

The firmware update protocol may be independently implemented by each existing manufacturer, and does not follow an open standard format. Therefore, a new model that does not use the existing firmware update protocol requires a task of analyzing the firmware update protocol, in which both a flash memory access command format and a flash memory read command format are stored. The firmware update protocol is implemented in a Secondary Boot Loader (SBL) or an Android boot loader (Aboot) provided in a boot loader, and thus the SBL or Aboot is analyzed, thus enabling the new flash memory access command and the new flash memory read command to be analyzed.

Further, partition information is analyzed in compliance with the flash memory read command at step S1030.

Recent smart devices mainly use a package structure in which NAND flash memory, called an Embedded Multi Media Card (Emmc), and a controller are integrated, and efficiently manage stored data using a file system, such as Yet Another Flash File System (YAFFS) or External File system (EXT) 3/4. Further, partitions such as BOOT, RECOVERY, SYSTEM, and USERDATA are mounted and used in smart devices using a partition function. To acquire data from such flash memory, information about the partitions of the flash memory is required.

Each smart device may access the partition signature of the flash memory using a flash memory read command, and may analyze the types of partitions using the partition signature.

Here, the types of partitions may include a Master Boot Record (MBR), a GUID Partition Table (GPT), etc.

The partition table values corresponding to the partitions are parsed, so that the size of the flash memory, the names of the partitions, the address at which each partition starts, and the address at which each partition ends may be analyzed.

The results of analysis may be output via an output unit, and are illustrated in FIG. 7. Referring to FIG. 7, the total number of partitions, the names of the partitions, and the start addresses and end addresses of the partitions are illustrated.

Further, the dump of the flash memory is performed and the forensic data is acquired based on the flash memory read command and the analyzed partition information at step S1040.

Figure 11:
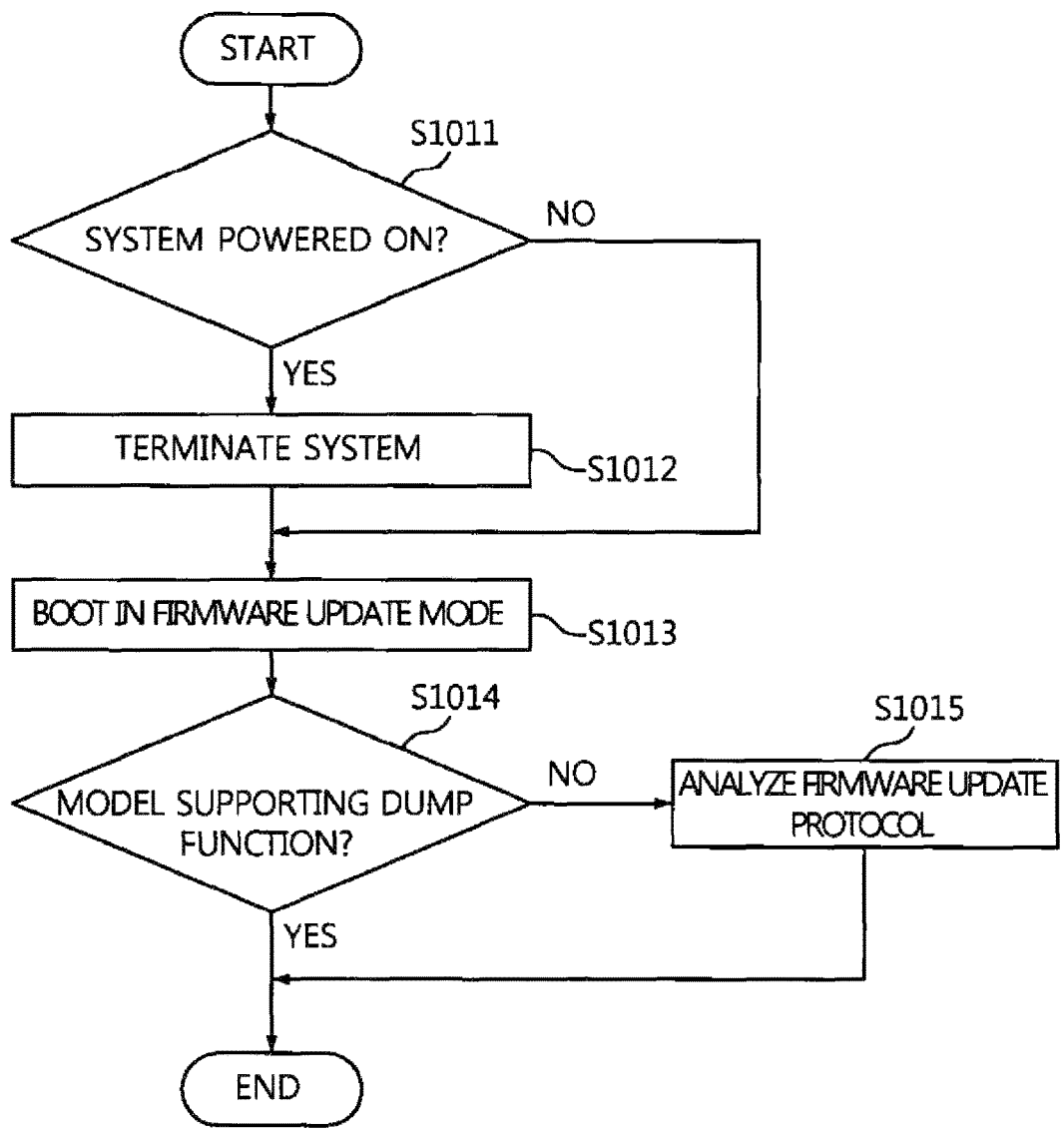
FIG. 11 is an operation flowchart showing the state in which a smart device enters a firmware update mode in the forensic data acquisition method according to an embodiment of the present invention.

FIG. 11 is an operation flowchart showing the procedure in which the smart device enters a firmware update mode in the forensic data acquisition method according to an embodiment of the present invention.

Referring to FIG. 11, whether the system of the smart device is powered on is determined at step S1011. If it is determined that the system is powered on, the system is terminated at step S1012.

Further, after the system has been terminated or when the system is powered off, the smart device is booted in a firmware update mode at step S1013.

Here, the smart device may enter the firmware update mode via the manipulation of a button key in the state in which the system is powered off.

To enter the firmware update mode, the smart device may enter the firmware update mode using resistance between pins 4 and 5 of a USB cable for connecting the smart device to the forensic data acquisition apparatus.

In the case of the USB cable, the access mode may differ depending on the resistance between pins 4 and 5. That is, the smart device may enter the firmware update mode depending on the resistance between pins 4 and 5. For example, when the resistance between pins 4 and 5 is 300 KΩ, a specific smart phone may enter the firmware update mode. When the resistance between pins 4 and 5 is 910 KΩ, another smart phone may enter the firmware update mode. That is, the command analysis unit 110 may determine the resistance between pins 4 and 5 of the USB cable for connecting the smart device that desires to enter the firmware update mode to the forensic data acquisition apparatus, and may control the USB cable based on the determined resistance, thus entering the firmware update mode.

The scheme for entering the firmware update mode may differ for each smart device. Referring to FIG. 4, the scheme for entering the firmware update mode may differ for each model. For example, to enter the firmware update mode in High-Tech Computer (HTC)'s model, shown in FIG. 4, a method of simultaneously pressing a volume-down key and a power key may be used. However, to enter the firmware update mode in Samsung's Galaxy, a method of simultaneously pressing a volume-down key, a home key, and a power key or of utilizing a USB cable having 300 KΩ may be used.

Further, whether the smart device is a model in which a dump function is supported is determined at step S1014. If the smart device is found to be a model in which a dump function is not supported, the firmware update protocol is analyzed at step S1015.

Figure 12:
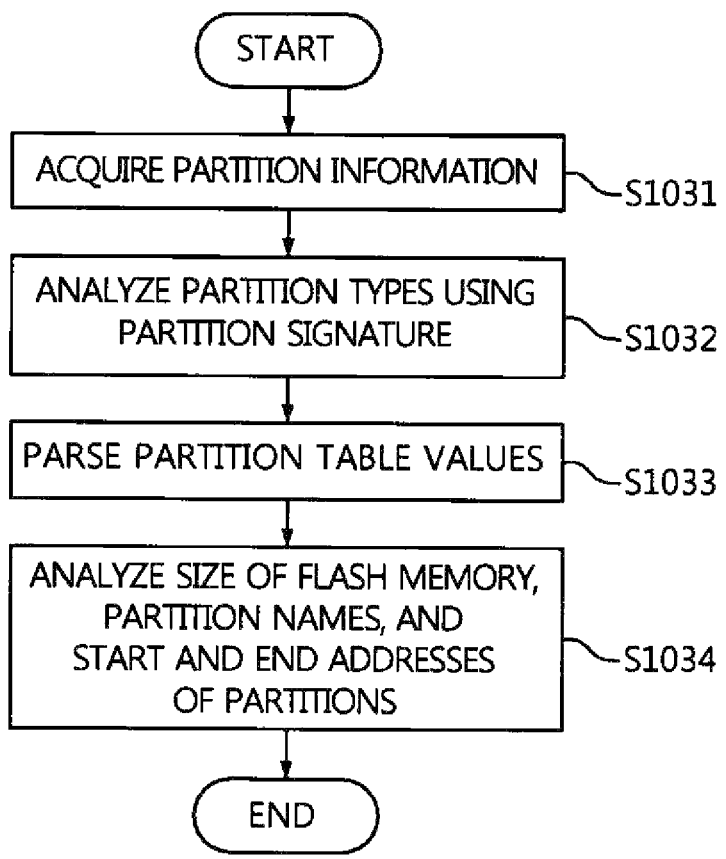
FIG. 12 is an operation flowchart showing the procedure for analyzing partition information in the forensic data acquisition method according to an embodiment of the present invention.

FIG. 12 is an operation flowchart showing the procedure for analyzing partition information in the forensic data acquisition method according to an embodiment of the present invention.

Referring to FIG. 12, partition information to be analyzed is acquired at step S1031, and partition types are analyzed using a flash memory read command and a partition signature at step S1032.

Further, partition table values are parsed at step S1033, and the size of the flash memory, the names of partitions, and the start and end addresses of the partitions are analyzed at step S1034.

Here, the results of analysis may be output via the output unit, and are shown in FIG. 7. Referring to FIG. 7, the total number of partitions, the names of the partitions, and the start and end addresses of the partitions are illustrated.

Figure 13:
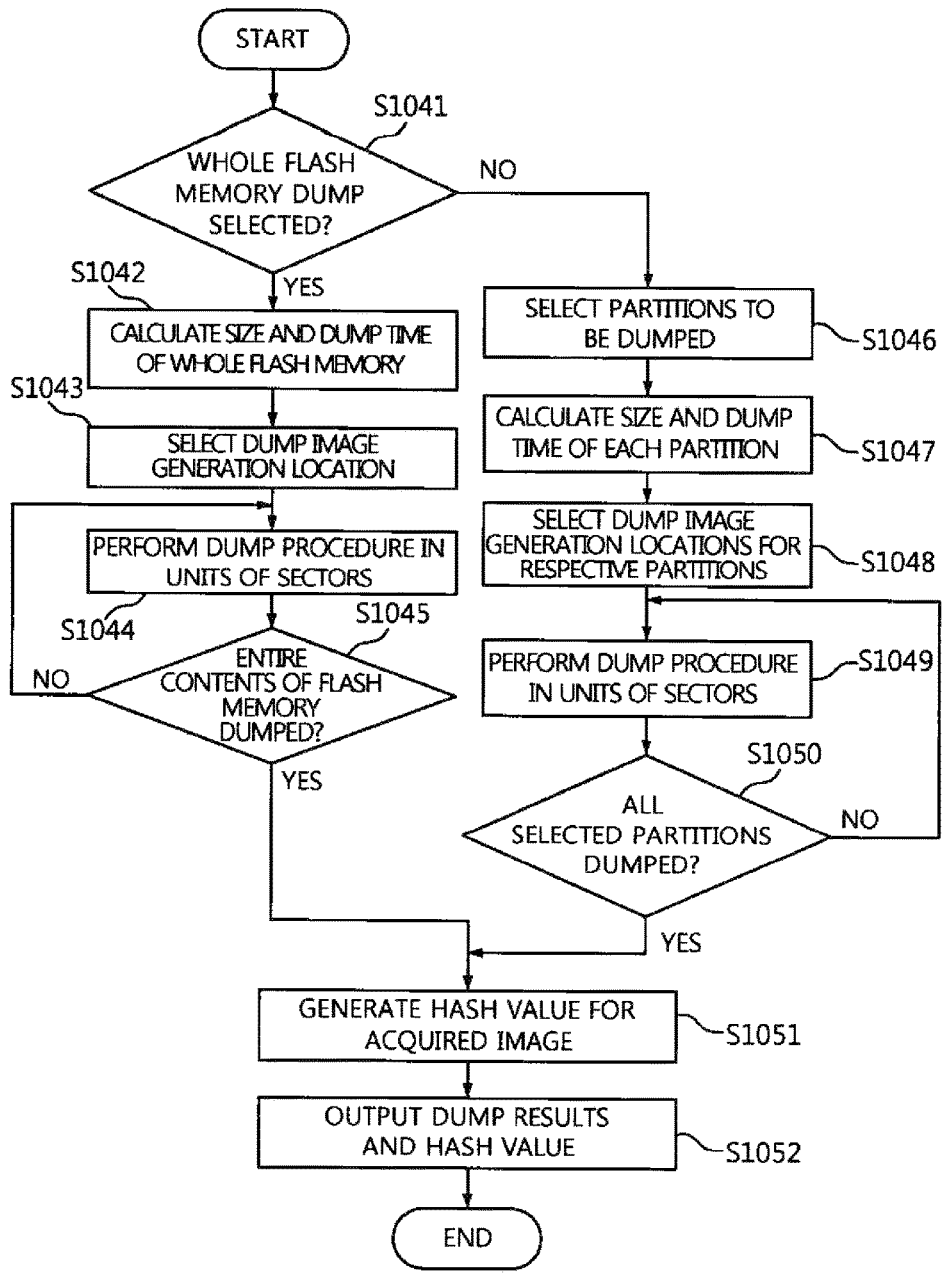
FIG. 13 is an operation flowchart showing the procedure for dumping flash memory in the forensic data acquisition method according to an embodiment of the present invention.

FIG. 13 is an operation flowchart showing the procedure for dumping flash memory in the forensic data acquisition method according to an embodiment of the present invention.

Referring to FIG. 13, whether to dump the whole flash memory (entire contents of the flash memory) is selected at step S1041.

Here, it is possible to select any one of a whole flash memory dump mode, in which the entire contents of flash memory are dumped, and a partition dump mode, in which the contents of partitions in the flash memory are dumped. When the whole flash memory dump mode is selected, a dump may be performed at the selected dump image generation location in units of sectors of the flash memory. Meanwhile, when the partition dump mode is selected, a dump is performed at the dump image generation location corresponding to each partition in units of sectors in the partition, and then a dump image may be generated. In the present invention, in the firmware update mode in which only the boot loader and the USB module are activated, an image may be physically dumped. As a result, even if data is repeatedly acquired multiple times, the integrity of the data may be maintained without falsifying original evidentiary data.

Here, if the whole flash memory is to be selected, the size and dump time of the whole flash memory are calculated at step S1042.

Next, the location at which a dump image is to be generated is selected at step S1043, and a dump procedure is performed in units of sectors at step S1044. The dump procedure is performed until the entire contents of flash memory have been dumped.

Further, when the entire contents of flash memory have been dumped at step S1045, a hash value for the acquired dump image is generated at step S1051, and the results of the dump and the hash value are output at step S1052.

In this case, to verify the integrity of the acquired data, the forensic data acquisition apparatus may further include an integrity verification unit (not shown) for generating a hash value using data and a hash function and verifying the integrity of data using the hash value. Since the hash function may be generally used to verify the integrity of data, the present invention uses a hash function to verify the integrity of the acquired data (forensic data).

Here, if it is determined that the whole flash memory is not selected, the partitions to be dumped are selected at step S1046, and the size and dump time of each partition are calculated at step S1047.

Further, the locations at which dump images are to be generated for respective partitions are selected at step S1048, and a dump procedure is performed in units of sectors at step S1049. The dump procedure continues to be performed until the all of the selected partitions have been dumped.

Furthermore, when all of the selected partitions have been dumped at step S1050, hash values for the acquired dump images are generated at step S1051, and dump results and hash values are output at step S1052.

In this case, to verify the integrity of the acquired data, the forensic data acquisition apparatus may further include an integrity verification unit (not shown) for generating a hash value using data and a hash function and verifying the integrity of data using the hash value. Since the hash function may be generally used to verify the integrity of data, the present invention uses a hash function to verify the integrity of the acquired data (forensic data).

As described above, the present invention acquires forensic data by activating only a boot loader and a USB module in a smart device that contains evidence, thus enabling evidentiary data to be acquired without damaging the smart device that contains the evidence.

Further, the present invention performs an operation in a firmware update mode so as to activate only a boot loader and a USB module in the smart device, thus acquiring forensic data while guaranteeing the integrity of flash memory.

As described above, in the forensic data acquisition apparatus and method according to the present invention, the configurations and schemes in the above-described embodiments are not limitedly applied, and some or all of the above embodiments can be selectively combined and configured so that various modifications are possible.

What is claimed is:

1. A forensic data acquisition apparatus comprising:
a processor; and
one or more units comprising executable code configured and executed by the processor using algorithm associated with a non-transitory storage device,
wherein the one or more units comprise:
a command analysis unit for activating a boot loader and a Universal Serial Bus (USB) module of a smart device and analyzing a format of a flash memory read command based on results of analysis of the boot loader;
a partition information analysis unit for analyzing partition information of flash memory in compliance with the flash, memory read command; and
a data acquisition unit for generating a dump image by dumping data stored in the flash memory based on the flash memory read command and the partition information, and for acquiring forensic data based on the dump image.

2. The forensic data acquisition apparatus of claim 1, wherein the command analysis unit causes the smart device to enter a firmware update mode and then enables only the boot loader and the USB module to be activated.

3. The forensic data acquisition apparatus of claim 2, wherein the command analysis unit analyzes the smart device, determines resistance between pins 4 and 5 of a USB cable for connecting the smart device that is intended to enter the firmware update mode to the forensic data acquisition apparatus, and controls the USB cable based on the resistance, thus causing the smart device to enter the firmware update mode.

4. The forensic data acquisition apparatus of claim 3, wherein the command analysis unit analyzes the flash memory read command based on results of analysis of a firmware update protocol for firmware in a Secondary Boot Loader (SBL) and in an Android boot loader (Aboot) provided in the boot loader.

5. The forensic data acquisition apparatus of claim 4, wherein the flash memory read command includes a read command signature field, a flash memory start address field, a dump size field, and a read command end field.

6. The forensic data acquisition apparatus of claim 5, wherein the command analysis unit is configured to, when the smart device is powered on, terminate the smart device and enter the firmware update mode.

7. The forensic data acquisition apparatus of claim 6, wherein the partition information analysis unit comprises:
a partition type analysis unit for analyzing types of partitions based on a partition signature of the flash memory; and
an information analysis unit for parsing partition table values corresponding to the partitions and analyzing one or more of a size of the flash memory, names of the partitions, start addresses of the partitions, and end addresses of the partitions.

8. The forensic data acquisition apparatus of claim 7, wherein the data acquisition unit comprises:
a mode selection unit for selecting any one of a whole flash memory dump mode and a partition dump mode for the partitions in the flash memory;
a whole dump performance unit for, when the whole flash memory dump mode is selected, performing a dump at a selected dump image selection location in units of sectors; and
a partition dump performance unit for, when the partition dump mode is selected, performing a dump at a dump image generation location corresponding to each selected partition in units of sectors of the partition.

9. The forensic data acquisition apparatus of claim 1, further comprising an integrity verification unit for generating a hash value using the acquired forensic data and a hash function and verifying integrity of the acquired forensic data using the hash value.

10. The forensic data acquisition apparatus of claim 9, further comprising an output unit for outputting a procedure for generating the hash, value and the dump image.

11. A forensic data acquisition method comprising:
activating a boot loader and a Universal Serial Bus (USB) module of a smart device and analyzing a format of a flash memory read command based on results of analysis of the boot loader;
analyzing partition information of flash memory in compliance with the flash memory read command; and
generating a dump image by dumping data stored in the flash memory based on the flash memory read command and the partition information, and acquiring forensic data based on the dump image.

12. The forensic data acquisition method of claim 11, wherein analyzing the format of the flash memory read command format is configured to cause the smart device to enter a firmware update mode and then enable only the boot loader and the USB module to be activated.

13. The forensic data acquisition method of claim 12, wherein analyzing the format of the flash memory read command is configured to analyze the smart device, determine resistance between pins 4 and 5 of a USB cable for connecting the smart device that is intended to enter the firmware update mode to the forensic data acquisition apparatus, and control the USB cable based on the resistance, thus causing the smart device to enter the firmware update mode.

14. The forensic data acquisition method of claim 13, wherein analyzing the format of the flash memory read command is configured to analyze the flash memory read command based on results of analysis of a firmware update protocol for firmware in a Secondary Boot Loader (SBL) and an Android boot loader (About) provided in the boot loader.

15. The forensic data acquisition method of claim 14, wherein the flash memory read command includes a read command signature field, a flash memory start address field, a dump size field, and a read command end field.

16. The forensic data acquisition method of claim 15, wherein analyzing the format of the flash memory read command is configured to, when the smart device is powered on, terminate the smart device and enter the firmware update mode.

17. The forensic data acquisition method of claim 16, wherein analyzing the partition information comprises:

analyzing types of partitions based on a partition signature of the flash memory; and parsing partition table values corresponding to the partitions and analyzing one or more of a size of the flash memory, names of the partitions, start addresses of the partitions, and end addresses of the partitions.

18. The forensic data acquisition method of claim 17, wherein acquiring the forensic data comprises:

selecting any one of a whole flash memory dump mode and a partition dump mode for the partitions in the flash memory;

when the whole flash memory dump mode is selected, performing a dump at a selected dump image selection location in units of sectors; and when the partition dump mode is, selected, performing a dump at a dump image generation location corresponding to each selected partition in units of sectors of the partition.

19. The forensic data acquisition method of claim 11, further comprising generating a hash value using the acquired forensic data and a hash function and verifying integrity of the acquired forensic data using the hash value.

20. The forensic data acquisition method of claim 19, further comprising outputting a procedure for generating the hash value and the dump image.

* * * * *